(12) United States Patent  (10) Patent No.: US 11,344,151 B2
Rolla  (45) Date of Patent: May 31, 2022

(54) OPTICAL RECOGNITION SYSTEM FOR CAPSULES FOR THE PRODUCTION OF HOT BEVERAGES

(71) Applicant: GB PROGETTI S.R.L., Rivanazzano Terme (IT)

(72) Inventor: Alberto Rolla, Genoa (IT)

(73) Assignee: GB PROGETTI S.R.L., Rivanazzano Terme (IT)

( * ) Notice: Subject to any disclaimer, the term of this patent is extended or adjusted under 35 U.S.C. 154(b) by 0 days.

(21) Appl. No.: 16/300,471

(22) PCT Filed: May 12, 2017

(86) PCT No.: PCT/IB2017/052812
§ 371 (c)(1),
(2) Date: Nov. 9, 2018

(87) PCT Pub. No.: WO2017/195170
PCT Pub. Date: Nov. 16, 2017

(65) Prior Publication Data
US 2019/0142212 A1    May 16, 2019

(30) Foreign Application Priority Data
May 12, 2016   (IT) .................. 102016000049084

(51) Int. Cl.
*B65D 85/80*   (2006.01)
*A23F 5/00*   (2006.01)
(Continued)

(52) U.S. Cl.
CPC ............. *A47J 31/4492* (2013.01); *A23F 5/26* (2013.01); *A47J 31/407* (2013.01); *B65B 29/022* (2017.08); *B65D 85/8058* (2020.05)

(58) Field of Classification Search
CPC ... A47J 31/4492; A47J 31/407; B65B 29/022; B65D 85/8043; B65D 85/804; B65D 85/8046; B65D 85/8058; A23F 5/26
See application file for complete search history.

(56) References Cited

U.S. PATENT DOCUMENTS 7,543,527 B2   6/2009 Schmed
7,552,672 B2   6/2009 Schmed
(Continued)

FOREIGN PATENT DOCUMENTS

DE   10 2013 013 596 A1   2/2015
DK           2085000 T3   1/2012
(Continued)

OTHER PUBLICATIONS

Written Opinion of the International Searching Authority dated Oct. 5, 2017, issued to International Application No. PCT/IB2017/052812.
(Continued)

*Primary Examiner* — Ericson M Lachica
(74) *Attorney, Agent, or Firm* — Shuttleworth & Ingersoll, PLC; Timothy Klima

(57) ABSTRACT

A method for the optical recognition of capsules for hot beverages machines comprises the steps of introducing a capsule in a machine, stimulating the capsule by an exciting optical signal emitted by a light source, reading a feedback optical signal by an optical reader, acquisition of the values of the frequency and/or the time frame of the feedback optical signal, determining the fulfillment of predetermined conditions on the values of the frequency and/or the time frame. On the basis of the step of evaluating there is then a step of blocking the normal operation of the machine or a step of pursuing the normal operation of the machine.

20 Claims, 6 Drawing Sheets

(51) Int. Cl.
*A47J 31/44* (2006.01)
*B65D 85/804* (2006.01)
*B65B 29/02* (2006.01)
*A23F 5/26* (2006.01)
*A47J 31/40* (2006.01)

(56) References Cited

U.S. PATENT DOCUMENTS

| | | | |
|---|---|---|---|
| 8,443,717 B2 | 5/2013 | Venturi | |
| 9,598,230 B2 | 3/2017 | Schmed | |
| 10,370,182 B2 | 8/2019 | Accursi | |
| 2006/0139928 A1* | 6/2006 | Griffiths | B65D 51/248 362/276 |
| 2008/0156196 A1* | 7/2008 | Doglioni Majer | B65D 85/8043 99/295 |
| 2009/0007792 A1 | 1/2009 | Glucksman et al. | |
| 2012/0058226 A1* | 3/2012 | Winkler | A47J 31/3695 426/79 |
| 2013/0129872 A1 | 5/2013 | Kruger | 426/115 |
| 2013/0230627 A1 | 9/2013 | Hansen et al. | |
| 2013/0340626 A1* | 12/2013 | Oh | A47J 31/521 99/295 |
| 2014/0287099 A1* | 9/2014 | Trombetta | B65D 85/8043 426/87 |
| 2015/0047509 A1* | 2/2015 | Trombetta | A47J 31/3676 99/283 |
| 2015/0158665 A1* | 6/2015 | Kruger | A47J 31/4492 426/112 |
| 2015/0158666 A1 | 6/2015 | Kruger et al. | |
| 2016/0174590 A1 | 6/2016 | Boggavarapu | |
| 2016/0185518 A1* | 6/2016 | Kruger | A47J 31/4492 426/115 |
| 2016/0242594 A1* | 8/2016 | Empl | A47J 31/60 |
| 2018/0042258 A1 | 2/2018 | Roberts et al. | |
| 2018/0044105 A1* | 2/2018 | Tomasi | B65D 85/8043 |

FOREIGN PATENT DOCUMENTS

| | | | | |
|---|---|---|---|---|
| EP | 2 481 330 A1 | 8/2012 | | |
| GB | 1402799 A1 * | 8/1975 | | B65D 81/266 |
| GB | 2477741 A | 8/2011 | | |
| WO | WO 2014/001564 A1 | 1/2014 | | |
| WO | WO 2014/202694 A1 | 12/2014 | | |
| WO | WO 2015/091193 A1 | 6/2015 | | |
| WO | 2016005113 A1 | 1/2016 | | |

OTHER PUBLICATIONS

International Search Report dated Oct. 5, 2017, issued to International Application No. PCT/IB2017/052812.
Colombian Office Action dated Jun. 19, 2020 from counterpart Colombian Application.
Colombian Office Action dated Dec. 9, 2020 from counterpart Colombian Patent Application No. NC2018/0012630.
Indian Office Action dated Apr. 8, 2021 from counterpart Indian Patent Application No. 201817041657.

* cited by examiner

OPTICAL RECOGNITION SYSTEM FOR CAPSULES FOR THE PRODUCTION OF HOT BEVERAGES

CROSS-REFERENCE TO RELATED APPLICATIONS

This application is a national stage of International Application No. PCT/IB2017/052812, filed May 12, 2017, which claims the benefit of priority to Italian Application No. 102016000049084, filed May 12, 2016, in the Italian Patent and Trademark Office, the disclosures of which are incorporated herein by reference.

FIELD OF THE INVENTION

The present invention relates to the field of hot beverage production by means of capsule.

In particular, the invention relates to a method for recognizing capsules inserted in a machine for making such beverages.

DESCRIPTION OF THE PRIOR ART

As well known, over the last few years domestic production of coffee and other hot drinks has spread by means of capsules to be inserted into machines with special housings.

As is well known, machine makers relying on these systems need to make sure that the capsules to be inserted into their machines are suitable and meet predetermined quality requirements.

In fact, the use of capsules that do not meet the required standards may vary unexpectedly the organoleptic properties of the finished product and may generate potential toxicity due to substances or slags released from the plastic material of which the capsules are generally composed. Also, the operation of the machine itself may be damaged, or at least it may be wearier than what the machine manufacturer predicts, thus invalidating the sales warranty.

Clearly, these issues negatively affect both the image of the machine maker both, above all, the consumer's use of the product.

Therefore, in the prior art, markers have been proposed in order to identify suitable products.

However, in the case of marking with a center point or an outer ring it is extremely easy for anyone to fool the system by marking a non-original capsule with a suitable fluorescent or phosphorescent marker.

To mitigate this risk, more sophisticated systems with more complex markings have been conceived: for example, multiple concentric rings or barcodes.

However, these systems are also easy to bypass by using a stamp or a marker with a template. Furthermore, it becomes unavoidable to use both lighting and reading systems proportionally more complex and expensive, up to reaching the need, as in the case of barcodes, of proper image sensors that also need software and processors that increase further the cost of the system, up to make it unusable on the easiest and cheapest machines, which are the largest market segment and the one of more interest.

All these optical systems have then a strong vulnerability to splashes and dirty that inevitably accumulate in the reading area.

US2016325923A1 discloses a capsule for making drinks comprising a body with a base and a closure. Between the base and the upper closure it is arranged an identifier detectable by the machine where the capsule is inserted.

The problem of this type of control of the product is that the identifier is located outside the capsule. This causes a plurality of drawbacks. First of all, the identifier may also be illicitly applied on unsuitable capsules according to the standards imposed by the manufacturer. In addition, being exposed to the outside, the identifier may be accidentally removed, dirtied, or damaged before the capsule is inserted into the machine, causing problems also on suitable capsules.

SUMMARY OF THE INVENTION

It is therefore a feature of the present invention to provide a method for the optical recognition of capsules for hot beverages machines that is effective and not easy to bypass.

It is also a feature of the present invention to provide such a method that is not expensive and that can be easily installed also on already designed machines.

It is also a feature of the present invention to provide such a method that allows to recognize different types of capsules so that the type of beverage production can be varied based on the specific capsule inserted.

These and other objects are achieved by a method for optical recognition of capsules for hot beverages machines comprising the steps of:
 marking the capsule with a recognition substance, said recognition substance arranged to emit an optical signal at a predetermined frequency B for a predetermined time frame K in response to an excitation by an optical signal at a predetermined frequency A and for a predetermined time frame H;
 introducing the capsule in a hot beverages machine;
 stimulating the capsule by an exciting optical signal emitted by a light source of the machine, said exciting optical signal being emitted at a predetermined frequency $f_1=A$ and for a predetermined time frame $t_1=H$;
 reading a feedback optical signal by an optical reader of the machine, said feedback optical signal being emitted by the capsule at a frequency $f_2$ and for a time frame $t_2$;
 acquiring the values of the frequency $f_2$ and/or the time frame $t_2$ of the feedback optical signal;
 evaluating the fulfillment of predetermined conditions on the values of the frequency $f_2$ and/or the time frame $t_2$, said step of evaluating being carried out by a control unit of the hot beverages machine;
 blocking the normal operation of the hot beverages machine in case that the step of evaluating is negative;
 pursuing the normal operation of the hot beverages machine in case that the step of evaluating is positive;
 whose main feature is that the recognition substance is located inside the capsule.

Advantageously, a step is also provided of piercing the capsule in order to carry out the steps of stimulating and reading.

Advantageously, a production step of the capsule is provided, said step comprising the steps of:
 prearranging a main body of the capsule;
 filling the main body with a predetermined food substance, for example coffee;
 introducing the recognition substance, by means of a permeable support element (120), for example a perforated disc, in the main body (110);
 sealing the main body (110) by a sealing film (130).

In particular, the recognition substance can be applied by molding on the permeable support element located above the substance food.

Alternatively, the recognition substance can be inserted directly in the material of which the permeable support element is made.

In an exemplary embodiment, the sealing film and/or the main body comprises at least one portion transparent to the optical signal emitted during the step of stimulating and to the feedback optical signal emitted during the step of reading.

This way, the upper film of the capsule can allow reading and checking the recognition substance, not allowing at the same time the accessibility to the recognition substance unless the capsule is tampered with.

This way, therefore, it is possible to mark the capsule with a recognition substance which allows the process of optical recognition above described both to recognize capsules unsuitable for machine operation both to recognize the specific capsule inserted.

Apart from being very versatile, the method described is also economical and easily implemented on machines that have already been designed.

In particular, the step of piercing is made by a perforation unit comprising at least one light guide.

Advantageously, the steps of stimulating and reading can be made through the punch pin arranged to pierce the capsule for injecting pressurized hot water in the production process of the hot beverage in the machine.

Advantageously, the step of evaluating is positive if it occurs the condition $f_2 \cong B$. In this case, the capsule is considered suitable if the frequency of the feedback optical signal is the one expected.

Alternatively, or in combination, the step of evaluating is positive if it occurs the condition $t_2 \cong K$. In this case, instead, the capsule is considered suitable if the time for transmitting the feedback optical signal is the one expected.

Advantageously, different conditions for the evaluation phase can be established, depending on the type of assessment you want to make. For example, you can change the range of acceptability of the frequencies at stake so you can determine the degree of accuracy of the selection.

In particular, a step is also provided of recognizing the capsule wherein the control unit detects a plurality of features of the capsule on the basis of the step of acquiring the values of the frequency $f_2$ and/or of the time frame $t_2$ of the feedback optical signal.

The conditions that cause the step of evaluating the suitability of the capsule can then be both on the frequency both on the time for transmitting the signal, or on a combination thereof, allowing generating a plurality of reference conditions that allow to extract by the capsule many information and not only the basics information on the suitability of the capsule.

For example, it is possible to detect the particular aroma contained in the capsule and to set the production process for the hot beverage on the basis of this information.

Advantageously, the frequencies $f_1$ and $f_2$ are different from each other and belong alternatively:
to the visible range;
to the UV range;
to the infrared range.

In particular, the frequency $f_1$ belongs to the UV range and the frequency $f_2$ belongs to the visible range. This can be obtained, for example, using as recognition substance a substance with fluorescent or phosphorescent features. In this case it is also possible to use the time for transmitting the feedback optical signal for access to many information about the content of the capsule.

According to another aspect of the invention, a system for recognizing capsules for hot beverages machines comprises:
a hot beverages machine comprising:
a light source arranged to emit an exciting optical signal at a predetermined frequency and for a predetermined time frame $t_1$=H;
an optical reader arranged to read a feedback optical signal emitted at a frequency $f_2$ and for a time frame $t_2$;
a capsule arranged to be inserted in the machine;
said hot beverages machine arranged to emit the exciting optical signal towards the capsule and to read the feedback optical signal,
the main feature of the system being that the machine comprises a control unit arranged to block the normal operation of the machine in case that the values of the frequency $f_2$ and/or the time frame $t_2$ do not meet predetermined conditions.

According to another aspect of the invention, a capsule for hot beverages machines is marked with a recognition substance, said recognition substance arranged to emit an optical signal at a predetermined frequency B for a predetermined time frame K in response to an excitation by an optical signal at a predetermined frequency A and for a predetermined time frame H.

BRIEF DESCRIPTION OF THE DRAWINGS

Further characteristic and/or advantages of the present invention are more bright with the following description of an exemplary embodiment thereof, exemplifying but not limitative, with reference to the attached drawings in which.

DESCRIPTION OF A PREFERRED EXEMPLARY EMBODIMENT

Figure 1:
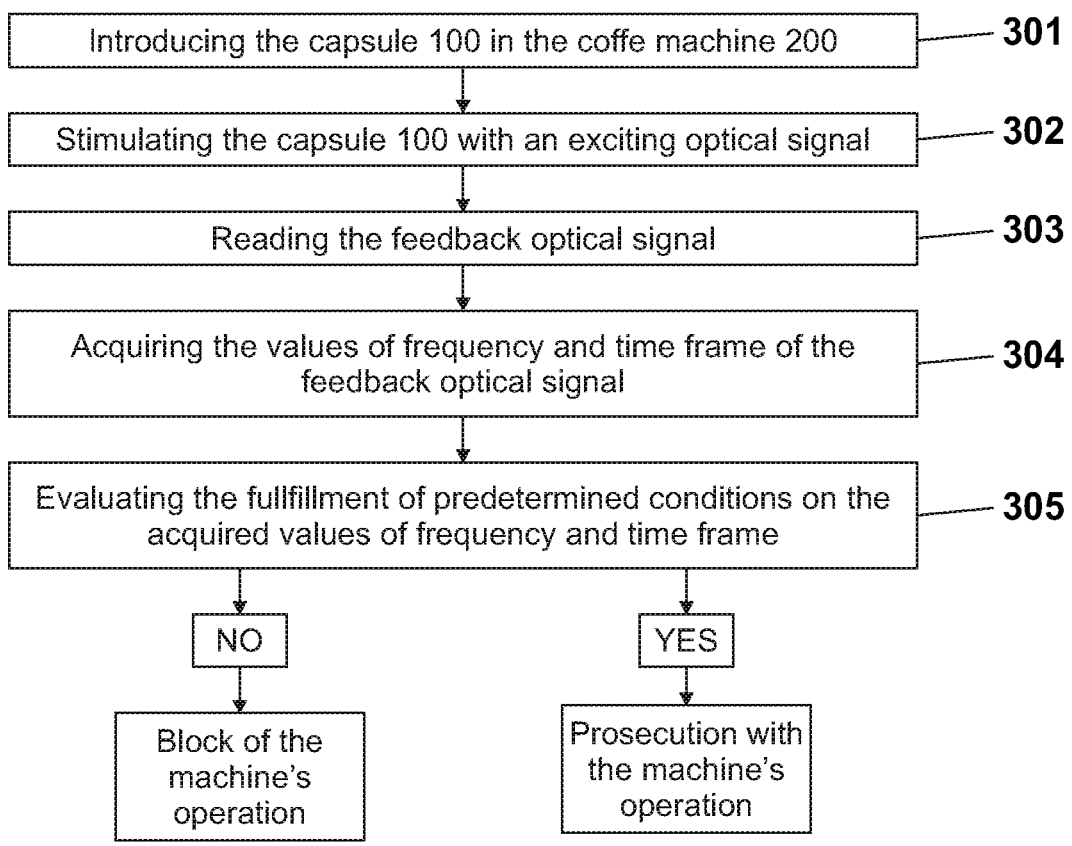
FIG. 1 shows a diagrammatical view of the method for the optical recognition of capsules, according to the present invention.

In FIG. 1 a diagrammatical scheme 300 is shown that describes, according to the present invention, a possible embodiment of the steps of the method for the optical recognition of capsules 100 for hot beverages machines.

After a first step of introducing the capsule 100 in the machine [301], there is a step of stimulating the capsule 100, wherein a light source 210 emits an optical signal with a predetermined frequency $f_1 \cong A$ and for a predetermined time frame $t_1 \cong H$ [302].

If the capsule 100 is remarkable with the predetermined recognition substance, it will respond to the optical signal received emitting a feedback optical signal at a frequency $f_2 \cong B$ for a time frame $t_2 \cong K$.

In a preferred embodiment, the recognition substance has fluorescence properties, i.e. capable of re-transmitting an optical signal consisting of visible frequencies when it is excited with an optical signal having frequencies in the ultraviolet range.

Figure 2A:
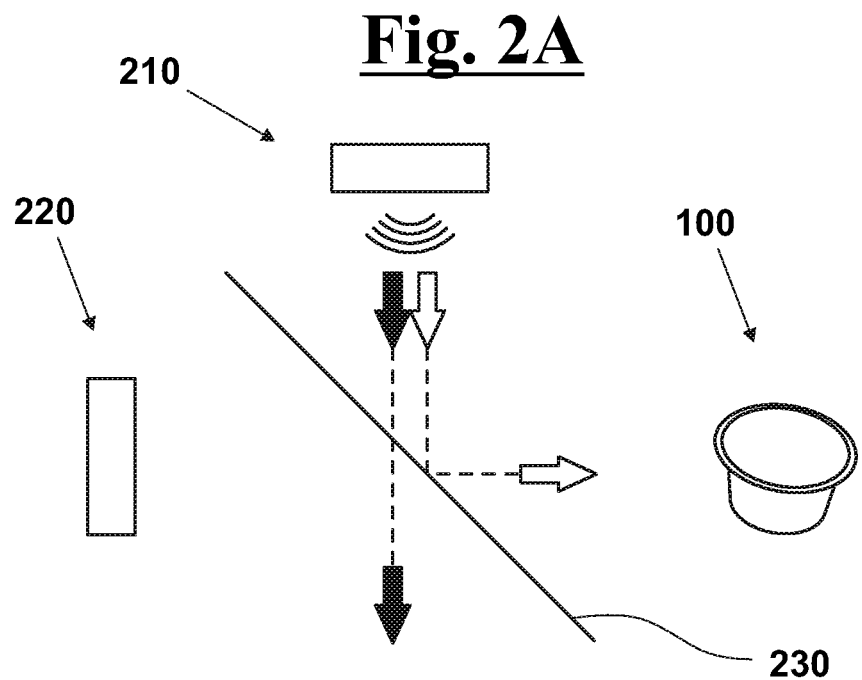
FIG. 2A diagrammatically shows the step of stimulating the capsule operated by a dichroic mirror.
Figure 2B:
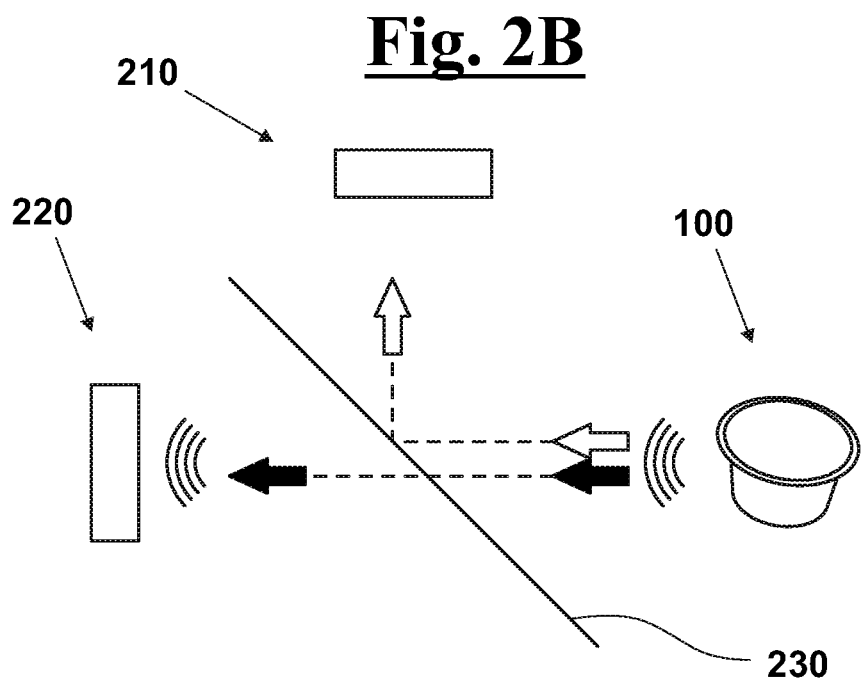
FIG. 2B diagrammatically shows the step of reading the feedback optical signal operated by a dichroic mirror.

In this exemplary embodiment, with reference even at FIGS. 2A and 2B, the machine has a dichroic mirror 230 arranged to result transparent to the optical frequencies of the visible range (black arrows) and to reflect the optical frequencies of the UV range (white arrows). This way, it is possible to use also low cost light sources 210, which normally emit light signals that in addition to the required frequencies UV contain also some unwanted visible frequencies. In this case, when the light source 210 will emit an optical bright signal comprising both visible and UV frequencies, only the UV ones are reflected towards the capsule 100, causing excitation.

The feedback optical signal is a signal comprising both the predetermined visible frequencies and the UV frequencies reflected and not converted by the recognition substance. With reference to FIG. 2B, again the mirror dichroic 230 is transparent to the visible frequencies and it will reflect the UV frequencies, sending back them towards the source 210. Only the visible frequencies will then arrive to an optical reader 220 that will initiate a step of reading the signal itself [303]. The fact that the parasite UV frequencies are removed by the feedback optical signal ensures to the optical reader 220 a reading enough accurate also in case that you use a low cost reader.

The source 210 and/or the optical reader 220 need not necessarily to be located near the capsule 100. The exciting and feedback optical signals can be transported by respective optical fibers or, advantageously, by a single optical fiber used in both the directions.

In another preferred exemplary embodiment, the recognition substance has phosphorescent properties, and it is therefore arranged to send back a feedback optical signal that extends in time after the turning off of the exciting optical signal, normally for several millisecond. In this case, the optical reader 220 can start the step of reading the feedback optical signal only after that the exciting signal has been interrupted, avoiding interferences of unwanted reflected frequencies, without the need of using the dichroic mirror. Such exemplary embodiment is therefore cheaper than the previous.

After a step of acquiring the values of the frequency $f_2$ and of the time frame $t_2$ of the feedback optical signal [304], a control unit starts a step of evaluating the fulfillment of predetermined conditions on such values [305]. If the capsule 100 was a capsule correctly marked, the values of $f_2$ and $t_2$ will satisfy the above described conditions, allowing the machine to proceed with its correct operation. Otherwise, the machine will be blocked, avoiding the production of the hot beverage.

For example, in an exemplary embodiment previously described, where it is used a recognition substance with phosphorescent properties, the control unit can evaluate the law with which there is the decay with time of the feedback optical signal and test if the decay time respects or not predetermined conditions. Such procedure can allow then to transmit a large number of information by appropriately changing the recognition substance and then the decay time of the feedback optical signal. In this case, the frequency of the exciting signal $f_1$ can coincide with the frequency $f_2$ of the feedback signal.

Figure 4:
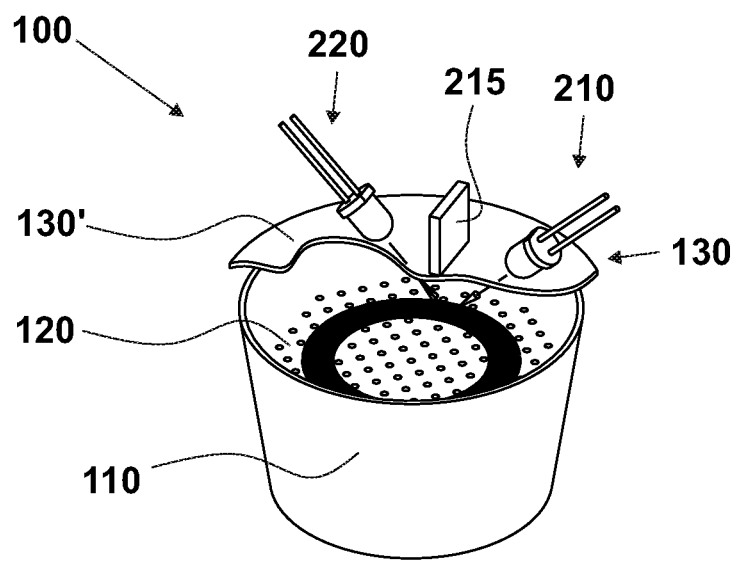
FIG. 4 shows, in cross section, an exemplary embodiment of the steps of stimulation and reading that provides a capsule having a transparent sealing film.
Figure 5:
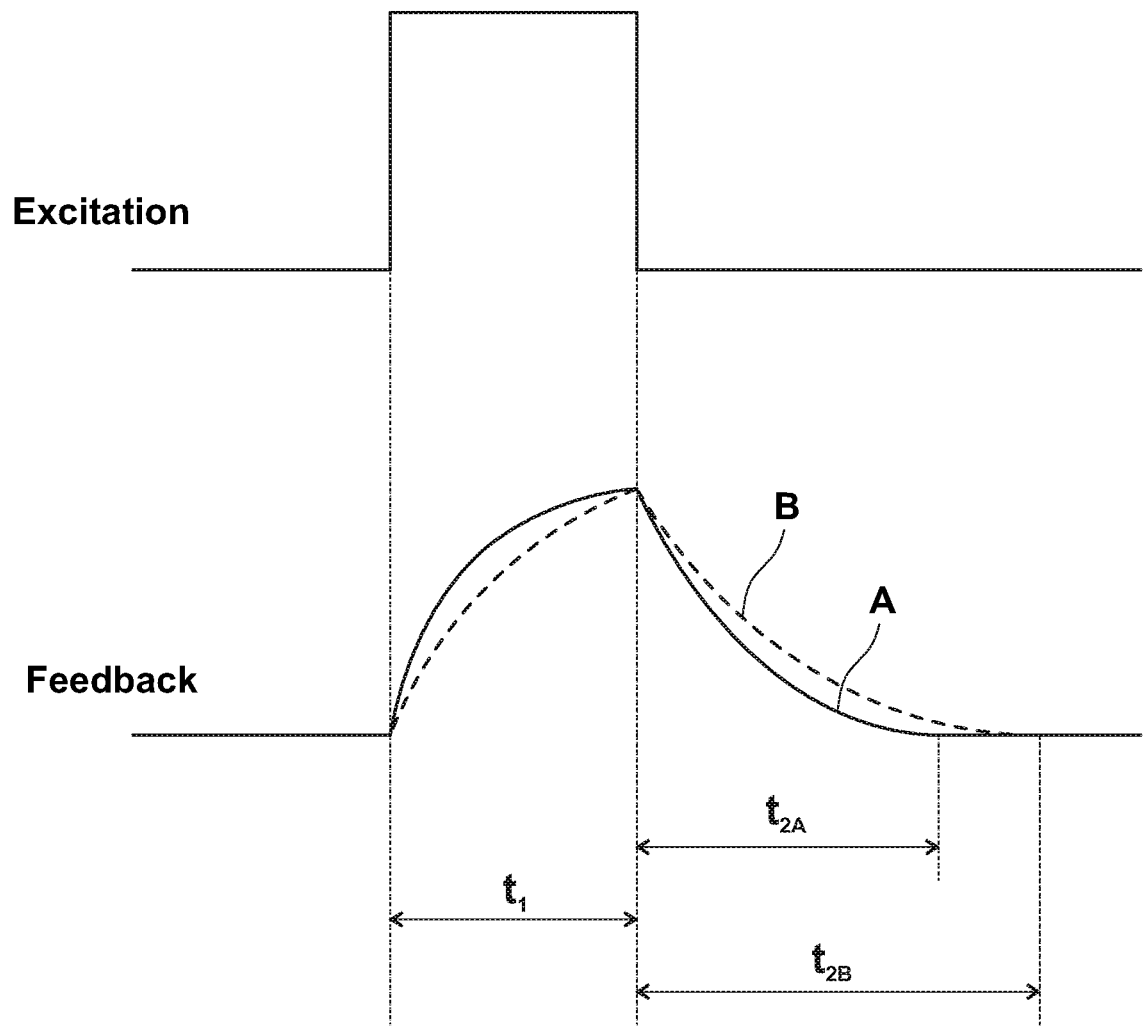
FIG. 5 graphically shows the trend with time of the exciting optical signals and of the feedback optical signal using two different recognition substances.

In FIG. 4 is graphically shown the typical trend with time of the exciting and feedback optical signals. In particular, given a step exciting signal having a time frame $t_1$, can be to seen as two different substances A and B emit a feedback signals with different time frames $t_{2A}$ and $t_{22B}$. Such, as above said, allows distinguishing the substances to each other.

In the FIGS. 3A, 3B, 3C and 3D, are shown some possible exemplary embodiments of the step of piercing the capsule 100 for carrying out the steps of stimulating and reading.

Figure 3A:
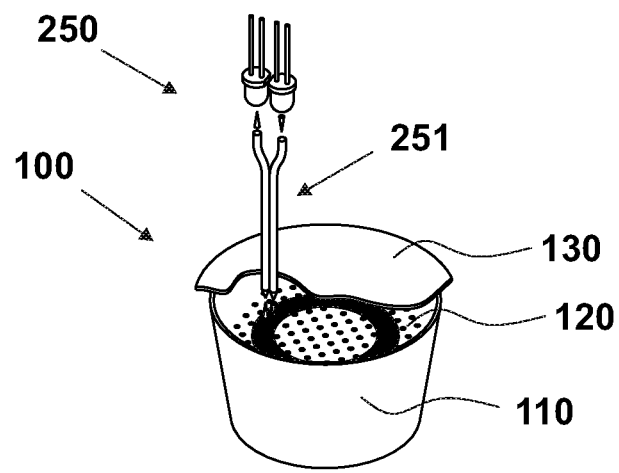
FIG. 3A shows, in cross section, a first exemplary embodiment of the step of piercing the capsule inside marked.
Figure 3B:
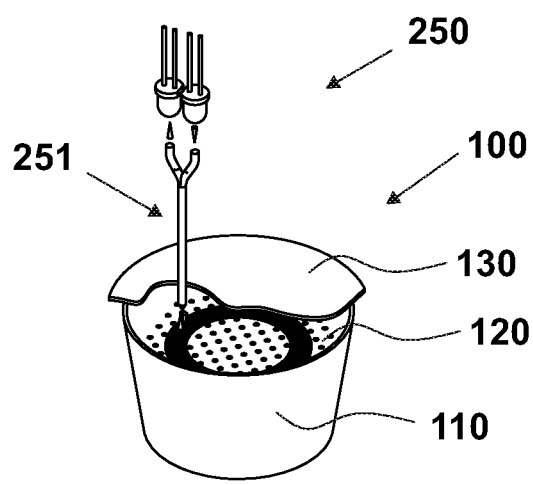
FIG. 3B shows, in cross section, a second exemplary embodiment of the step of piercing the capsule inside marked.

In the FIGS. 3A and 3B the unit that provides to the steps of stimulating and reading the substance located within the capsule 100 implements even the perforation of the capsule, regardless of the perforator, not shown and located in another desired point, arranged to introduce pressurized hot water in the production process for the hot beverage.

Figure 3C:
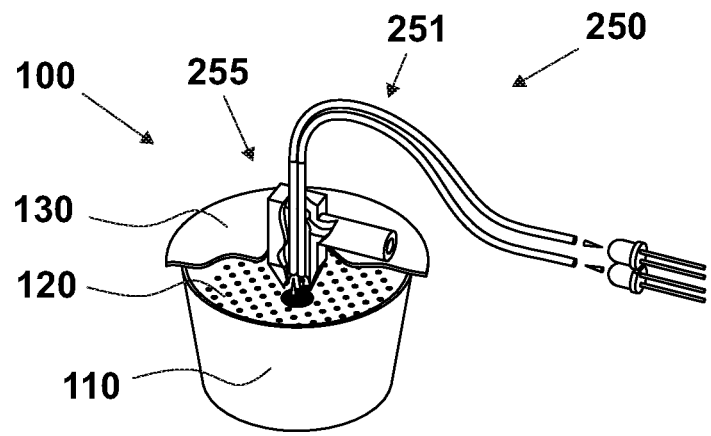
FIG. 3C shows, in cross section, a third exemplary embodiment of the step of piercing the capsule inside marked.
Figure 3D:
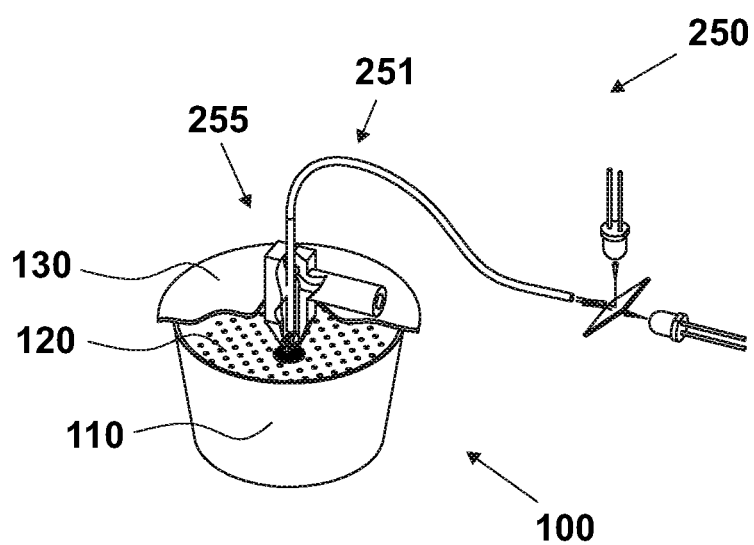
FIG. 3D shows, in cross section, a fourth exemplary embodiment of the step of piercing the capsule inside marked.

In the FIGS. 3C and 3D the unit that provides to the steps of stimulating and reading the substance located within the capsule is instead housed inside of the same perforator 255 arranged to introduce pressurized hot water in the production process for the hot beverage.

For mere exemplifying purposes, the recognition substance located inside has a ring shape in FIGS. 3A and 3B and a point-shaped shape in FIGS. 3C and 3D.

In particular, in FIG. 3A the perforation unit 250 comprises two separate light guides 251, consisting of two glass or plastic perforating rods, in optical connection with the relative components located at short distances.

In FIG. 3B the perforation unit 250 comprises instead a single light guide 251 comprising a single glass or plastic perforating rod, in optical connection with the respective lighting/reading components, thanks to a suitable splitter of the two signals.

In FIG. 3C the perforation unit 250 comprises two separate light guides 251, housed within the punch pin 255 arranged to introduce the hot water, which allow to house the components of lighting/reading on the main electronic board, which is located in remote.

In FIG. 3D the perforation unit 250 comprises a single optical fiber 251, housed within the punch pin 255 arranged to introduce the hot water, and a suitable splitter of the 2 signals mounted on the main electronic board, which is located in remote.

In FIG. 4 the capsule 100 comprises a film 130 having at least one transparent portion. In this exemplary embodiment, the steps of stimulating and reading the inner marker are made through the light source 210 and the optical reader 220, without needing to perforate the film 130 itself.

In this exemplary embodiment, the light source 210 and the optical reader 220 can be separated by a barrier 215 arranged to be placed in contact with the transparent portion 130' in order to prevent that, in case of introducing a not suitable capsule having an illicit recognition substance located on the outer surface of the film 130, the feedback optical signal can reach the optical reader 220.

The foregoing description some exemplary specific embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realize the different functions described herein could have a different nature without, for this reason, departing from the field of the invention. It is to be understood that the phraseology or terminology that is employed herein is for the purpose of description and not of limitation.

The invention claimed is:

1. A capsule for use in a hot beverage machine, the capsule comprising:
    a main body comprising a side wall, a bottom wall and an upper edge, wherein the bottom wall is a continuous flat base that extends between a lower edge of the side wall
    a sealing film closing the upper edge to seal the main body,
    a permeable support element located in the main body and establishing:
        a first chamber positioned above the permeable support element, wherein the first chamber is bounded between the permeable support element, the side wall and the sealing film, and
        a second chamber positioned below the permeable support element, wherein the second chamber is bounded between the permeable support element, the side wall and the bottom wall,
    a food substance positioned in the second chamber, the food substance having a top surface,
    the permeable support element including a recognition substance, the recognition substance being configured to emit an optical signal at a predetermined frequency B for a predetermined time frame K in response to an excitation by an optical signal at a predetermined frequency A and for a predetermined time frame H;
    wherein the first chamber is an empty open air space extending from the recognition substance to the sealing film;
    wherein the recognition substance is positioned on a top surface of the permeable support element;
    wherein the permeable support element is positioned above the top surface of the food substance to cover the food substance and position the recognition substance above the top surface of the food substance and below the sealing film such that a top surface of the recognition substance faces the sealing film, is open to the first chamber open air space and is optically viewable in the first chamber open air space.

2. The capsule according to claim 1, wherein at least one chosen from the sealing film and the main body includes at least one transparent portion arranged to allow the emission by the recognition substance of the optical signal at the predetermined frequency B for the predetermined time frame K in response to the excitation by the optical signal at the predetermined frequency A and for the predetermined time frame H.

3. The capsule according to claim 2, wherein the permeable support element is shaped as a perforated disc.

4. The capsule according to claim 2, wherein the recognition substance has fluorescent properties.

5. The capsule according to claim 2, wherein the recognition substance has phosphorescent properties.

6. The capsule according to claim 2, wherein the recognition substance is inserted directly in a material of which the permeable support element is made.

7. The capsule according to claim 2, wherein the recognition substance is printed on the permeable support element.

8. The capsule according to claim 3, wherein the recognition substance has fluorescent properties.

9. The capsule according to claim 8, wherein the recognition substance has phosphorescent properties.

10. The capsule according to claim 9, wherein the recognition substance is inserted directly in a material of which the permeable support element is made.

11. The capsule according to claim 9, wherein the recognition substance is printed on the permeable support element.

12. The capsule according to claim 1, wherein the permeable support element is shaped as a perforated disc.

13. The capsule according to claim 1, wherein the recognition substance has fluorescent properties.

14. The capsule according to claim 1, wherein the recognition substance has phosphorescent properties.

15. The capsule according to claim 1, wherein the recognition substance is inserted directly in a material of which the permeable support element is made.

16. The capsule according to claim 1, wherein the recognition substance is printed on the permeable support element.

17. The capsule according to claim 12, wherein the recognition substance has fluorescent properties.

18. The capsule according to claim 17, wherein the recognition substance has phosphorescent properties.

19. The capsule according to claim 18, wherein the recognition substance is inserted directly in a material of which the permeable support element is made.

20. The capsule according to claim 18, wherein the recognition substance is printed on the permeable support element.

* * * * *